Figure 1:
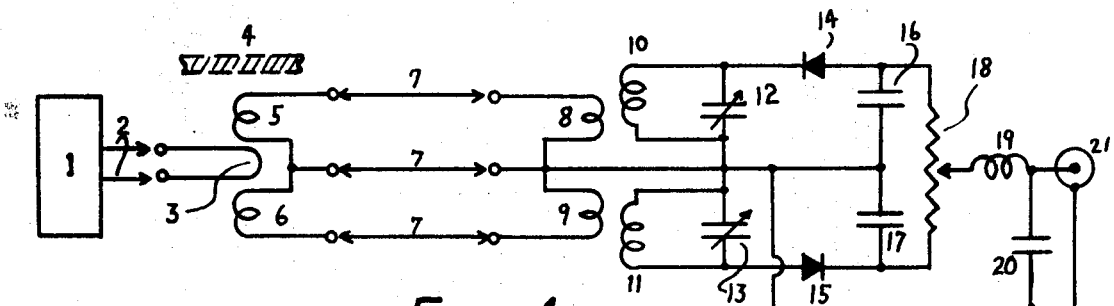

United States Patent

[11] 3,609,527

| [72] | Inventor | James F. Ellis<br>Skyland Drive, Box 248 Rte. 2, Powell, Tenn. 37849 |
|---|---|---|
| [21] | Appl. No. | 827,630 |
| [22] | Filed | May 26, 1969 |
| [45] | Patented | Sept. 28, 1971 |

[54] NONCONTACTING PROXIMITY GAGE UTILIZING INDUCED EDDY CURRENTS, HAVING IMPROVED DYNAMIC RESPONSE AND INTERFERENCE DISCRIMINATION
8 Claims, 4 Drawing Figs.

[52] U.S. Cl. .................................................. 324/40, 324/34 D, 340/199
[51] Int. Cl. ........................................................ G01r 33/00
[50] Field of Search ........................................... 324/34, 40, 41; 340/199

[56] References Cited
UNITED STATES PATENTS

| 2,372,056 | 3/1945 | Broding | 324/34 |
| 2,408,524 | 10/1946 | Mestas | 340/199 |
| 2,457,727 | 12/1948 | Rifenbergh | 324/34 |
| 2,504,731 | 4/1950 | Rose et al. | 324/41 |
| 3,147,574 | 9/1964 | La Pointe et al. | 324/34 |
| 3,185,923 | 5/1965 | Sadofsky | 324/34 |
| 3,286,168 | 11/1966 | Schmidt | 324/40 |

FOREIGN PATENTS

| 222,922 | 9/1958 | Australia | 324/40 |
| 875,567 | 8/1961 | Great Britain | 324/41 |

*Primary Examiner*—Rudolph V. Rolinec
*Assistant Examiner*—R. J. Corcoran
*Attorney*—Richard A. Farley

ABSTRACT: This invention relates to distance measuring instruments utilizing the effects of induced eddy currents. It features a differential probe operating at low impedance, high frequency, and so matched to its input and output lines that it serves as a differential coupler rather than a resonance slope detector. One embodiment utilizes a tuned differential detector and another employs a phase splitter and a tuned logarithmic amplifier for fast linearized response. The use of low impedances, tight coupling, and a system of common mode rejection make the device insensitive to all signals except the desired differential carrier signal. The device is capable of very fast response in hostile environments.

INVENTOR
James F Ellis

NONCONTACTING PROXIMITY GAGE UTILIZING INDUCED EDDY CURRENTS, HAVING IMPROVED DYNAMIC RESPONSE AND INTERFERENCE DISCRIMINATION

The invention described herein was made in the course of, or under, a contract with the U.S. Atomic Energy Commission.

Distance measuring devices which do not make any physical contact with the other object under observation have become very useful instruments having numerous applications. They may be used for such purposes as the observation of motions of turbine blades and numerous types halves rotating devices, the flutter of aircraft wings in wind-tunnel tests, and even the vibrations induced in the core of a pulsed nuclear reactor provided the instrument can be made operable in such a hostile environment. These instruments can also be very useful for measuring the velocity of an object which has been propelled by a sudden release of a large amount of electrical energy provided the instrument has sufficient speed of response to follow the high velocity object and provided it has sufficient discrimination to the electrical interference thus set up. Such a system could prove useful for evaluation of cacapacitor-discharge metal forming techniques now being developed for industrial applications.

Electrical noncontacting distance gages for close proximity measurements are essentially of two basic types. One of these types determines the distance to a conducting object by measuring the electrical capacitance between a charged plate and the object in question. The various methods by which this capacitance can be measured are not directly related to the purpose of this invention and are therefore not discussed here.

The other basic type of noncontacting distance gage utilizes the eddy current effect. When an alternating current is passed through a coil of wire, it sets up an alternating magnetic field corresponding to the magnitude of the current but at right angles to it. When a conducting material is placed within this alternating magnetic field, current will be generated in that material and will circulate within the material itself at right angles to the magnetic field in such a way as to have a repelling effect on the magnetic field. By detecting and measuring these circulating, or eddy currents, the distance between the coil and the object may be determined.

Capacitance type distance gages can be used only in those cases where the dielectric material (usually air) maintains good dielectric qualities. For this reason, these gages cannot be used near any device producing ionizing radiations if good reliability is to be maintained. Because of the capacitance coupling involved, they may also become unreliable in fields of high energy radiofrequency radiations.

Eddy current distance gages are better adapted to making measurements in an ionized atmosphere than are capacitance devices because the inductive coupling nearby an object if not greatly affected by the ionized region. Their behavior in fields of high energy radiofrequency radiation depends on several factors relating to frequency and modes of coupling.

In order for an eddy current gage to have good sensitivity and accuracy, a coil in the sensing head or probe must be supplied with an alternating current of relatively high frequency, usually in the radio frequency (RF) range. Frequencies ranging from 50 kHz. to 1 mHz. are commonly used. One method of producing an eddy current distance gage is to incorporate the sensing coil into a bridge circuit that is made sensitive to changes in inductive, or impedance balance, phase balance, or a combination of both. Another method is to make the sensing coil behave simply as a variable loss mechanism when it is brought near an object where eddy currents are induced. In either case, the sensing probe is placed at one end of a coaxial cable which has its opposite end attached to the circuit containing the remaining electronic components.

In the above cases regarding eddy current gages, there remains some sensitivity to both ionizing radiations and to strong radiofrequency energy. An ionized atmosphere increases the loss in the sensing coil by acting as a partial short circuit in and around the coil and thus generates a false reading. If the device is to be used to measure very rapid mechanical movements, the total frequency-bandwidth of the circuit becomes a limiting factor since it must be at least twice that of the maximum mechanical frequency to be observer in order to pass both upper and lower sidebands. This bandwidth can be improved by increasing the exciting (carrier) frequency, but the proper balancing and phasing of the circuits becomes more of a problem and may become impossible at very high frequencies.

As mentioned above, some prior-art instruments utilizing the eddy current effect connect the probe and its coil assembly as one arm of a bridge. When this is done, the capacitance of the connecting cable enters into the total capacitance that determines the resonant frequency of that portion of the circuit. The result is that when the impedance of that portion of the bridge is lowered, the resonant frequency increases as the relative signal level across the impedance decreases. This "resonance slope" effect is used in these instruments to further enhance and linearize their response. Such circuits perform quite well at frequencies of 1 mHz. or less provided the length of the probe's connecting cable is not too great. As the frequency of the oscillator is increased in an effort to obtain greater frequency-bandwidth, the probe's connecting cable must be made shorter or else the standing-wave ratio will become so high that the instrument will become unreliable or inoperative. As a result, instruments whose sensing probes perform as portions of a bridge are limited in frequency-bandwidth and the distance between the basic circuit and the sensing probe.

Other prior-art distance gages have employed two series opposing inductors or arms of an inductance bridge in the sensing probe. These may also be of the resonance slope variety or they may be relatively high inductance untuned transformers operating at super-audiofrequencies. In either case, their impedances are relatively high and they have the same general restrictions as to frequency-bandwidth and susceptibility to ionizing radiations as the devices using single bridge arms in the sensing probes.

When tests are performed on certain types of nuclear reactors or high speed machines presenting a personnel safety hazard, it is a practice to locate the recording instrumentation in a remote place. Such remote location of instruments, combined with the desired range of frequency response and wide bandwidth as well as the desirability to perform in certain types of hostile environments preclude the use of prior-art instruments.

The purpose of this invention is to provide a noncontacting proximity gage capable of the following features:
1. operation in an ionized atmosphere,
2. operation in fields of high energy electromagnetic interference,
3. response to mechanical displacements whose frequency components may range from DC to several hundred kHz. or even higher,
4. suitable response and sensitivity to a variety of conducting materials, whether magnetic or not,
5. the ability to operate with considerable distances separating the probe from the other circuit components.

The methods by which these objectives are achieved are described as follows:

To clearly understand the novelty of this invention, it is necessary to consider the general operating parameters of all the prior-art devices. These may include hybrid differential transformers and various differential inductance sensors as well as the devices already described. Review of these devices presents a preponderance of dependence upon high inductance, high impedance devices which make no attempt to match their respective connecting lines to the impedances of the inductors. In all cases thus far found, the respective transmission lines operated merely as either shielded or open lead wires, and their capacitance merely added to the total circuit capacitance. While coaxial lines are used in some of these devices, they do not operate at their characteristic impedance and merely add to the total circuit capacitance. Frequencies ranging from the low audio to low RF range have previously been used. Reliance has been placed primarily on sensitive circuits which can accurately measure static conditions, or circuits which have a moderately fast response in nonhostile environments.

To achieve the desired objectives, the subject invention abandons the concept of all sensitive high impedance circuits. A differential probe is used which, as nearly as possible, maintains the same impedance as its respective transmission lines. All stray capacitance is held to a minimum. The carrier frequency is elevated to the practical upper limit determined by the open circuit resonance of the probe coils. In contrast to prior art devices, the coupling in the respective probe coils is made relatively tight so that most of the energy arriving at the probe is passed on to the differential output circuits. One variation of the invention uses the probe as a high-frequency absorber and passes back out only a resulting differential signal. The mechanism, or basis of operation, should be considered as an oscillator driven transmission line which is split in two parts by action of the differential probe, and later recombined to form the desired output signal. These low impedance, low capacitance parameters are combined in a differential configuration which yields very fast response and very good discrimination against interference caused by ionizing radiation and electromagnetic fields. Besides increasing the frequency-bandwidth of the system, this greatly increased carrier frequency enables the inductance of the probe coils to be reduced to the point where only a very few turns of wire are used on small probes, and larger probes may use a single loop for each coil. Such construction reduces the unwanted circuit capacitance to a minimum.

The operation of the invention will now become apparent upon examination of the accompanying drawings.

FIG. 1 is a schematic diagram of the basic elements of the subject invention in which 1 is an oscillator and 2 is a primary transmission line coupling the oscillator to a sensing-probe input. Coils 3, 5 and 6 are ring-shaped coils wound end to end and comprise the essentials of the sensing probe. The surface of a conducting object in proximity to pickup coil 5 is represented by 4. Another pickup coil similar to 5 and located an equal distance on the opposite side of 5 is represented by 6. A dual secondary transmission line carrying signals to a remote station is represented by 7. Primary coils of a differential detector are represented by 8 and 9. Secondary coils which together with variable capacitors 12 and 13 form two similar resonant circuits are represented by 10 and 11. Diodes arranged to conduct during the same half cycle of the current flow are represented by 14 and 15. Represented by 16 and 17 are RF bypass capacitors sufficiently small so as not to degrade the wide bandwidth output of the device. A balancing potentiometer is represented by 18, 19 is an RF filter choke, 20 is an RF bypass capacitor, and 21 is the signal output.

The primary coil 3 of the sensing probe receives energy from the oscillator and produces an alternating magnetic field of high frequency which cuts coils 5 and 6 equally when 4 is not present. Equal RF carrier signals are fed to resonant circuits composed of 8, 10, 12 and 9, 11, 13, respectively. The output sides of diodes 14 and 15 then carry equal DC voltages of opposite polarity. Potentiometer 18 is used to select a balance between positive and negative DC voltages resulting in a zero output.

When object 4 is present, some of the electromagnetic energy radiated by coil 3 cuts the surface of the object, generating eddy currents which oppose the field set up and cause coil 5 to receive less energy than coil 6. The two halves of the system now are unbalanced with resonant circuit 8, 10, 12 receiving less energy than circuit 9, 11, 13. The negative voltage at the anode of diode 14 is now less than the positive voltage at the cathode of diode 15 causing the signal output to go positive. The instrument now produces a positive-going signal as the object comes nearer coil 5 which is located at the outer end of the probe. The slope of the output signal can be reversed merely by exchanging the output connections of coils 5 and 6. A DC offset can be supplied to the instrument's output by changing the balance of potentiometer 18. The coupling of coil 8 to coil 10 and coil 9 to coil 11 can be adjusted to complete the balancing of the two carrier amplitudes. Proper tuning of capacitors 12 and 13 produces phase relationships of approximately 180° and minimizes the RF filtering necessary at the output.

In contrast to devices using the resonance slope principle, the tuned circuits 8, 10, 12, and 9, 11, 13 have little or no effect on the response of the probe coils. Their differential output is a result of differential amplitude, not phase. The advantage of phasing the coils 8, 10 and 9, 11 so that diodes 14 and 15 will conduct simultaneously is that there will be an instantaneous cancellation of the carrier, leaving only the difference signal and requiring minimum carrier filtering. When long transmission lines 7 are used between the probe and the detector, temperature variations will affect the propagation characteristics in these lines and it may be impossible to maintain the signals at diodes 14 and 15 at the desired 180° relationship. This does not affect the response of the instrument other than to cause the observed oscilloscope trace of the output to appear wider than normal due to the presence of superimposed carrier. (It is assumed that the output signals will be recorded by fast oscilloscope photography or other high-speed means.) This feature enables the instrument to be used with lines much longer than would otherwise be possible at these carrier frequencies. Transmission lines 7 are in effect a divided continuation of transmission line 2, and coils 3, 5, and 6 are so coupled as to form the best possible transmission line match, but one whose balance is affected by nearby surface eddy currents or skin effects. The couplings of circuits 8, 10, 12 and 9, 11, 13 are adjusted to optimized the transfer of energy from transmission lines 7, and their tuning serves to adjust the phase relationship of the carrier appearing at the diodes to the desired 180°.

In the event of strong ionizing radiations where the surrounding atmosphere becomes a partial short circuit, the effects on each half of the system are essentially identical due to the physical location of coils 5 and 6 causing their resulting error-signals to cancel at the detector. The same situation holds true when the device is used in fields of high intensity electromagnetic interference. The broadband tuning of the two halves of the detector further reduce noise interference while permitting the desired carrier sidebands. Shielded cables for 2 and 7 are preferred, and it is assumed that the entire circuit is to be shielded according to good engineering practice.

Figure 2:
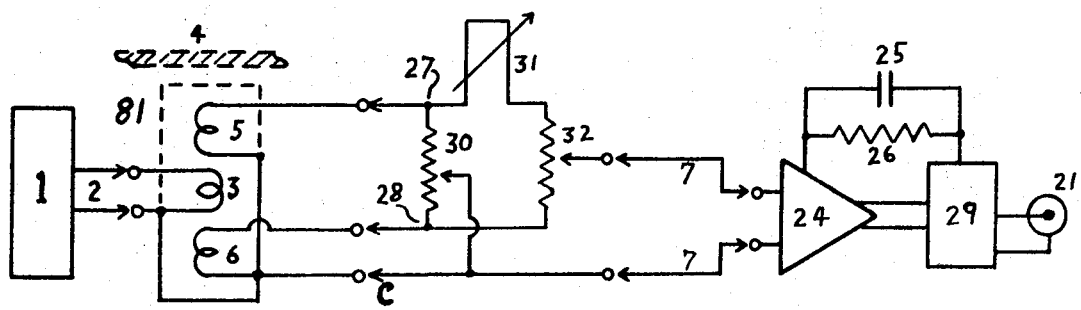

FIG. 2 is another embodiment of the invention showing a slight alteration of the probe circuit and the addition of other features. Oscillator 1 drives a length of primary transmission line 2 which in turn drives primary coil 3. Item 81 is an electrostatic shield. Coils 3, 5, and 6 comprise the active elements of the sensing probe. Coil 3 sets up a high-frequency field which cuts coils 5 and 6 equally when no object is near and produces signals that are in phase at points 27 and 28. Potentiometer 30, delay line 31, and potentiometer 32 comprise a balancing network which is located a short distance from the probe, providing a means for adjusting both amplitudes and phase angles of the two signals.

A length of secondary transmission line 7 may be of any practical length, and connects the differential output of potentiometer 32 to the input of a tuned logarithmic amplifier 24. Carrier level detector 29 has a feedback loop containing capacitor 25 and resistor 26. This feedback provides a gain control mechanism for amplifier 24, with the time constant provided by 25 and 26 serving to further improve the amplifier response. When delay line 31 is properly adjusted, the two carrier signals at potentiometer 32 are 180° out of phase. Proper adjustment of 30 and 32 result in a zero level signal at the transmission line 7. When an object comes near the probe the signals at 27 and 28 are unbalanced an slightly out of phase, and at 32 the carrier signal is unbalanced in both amplitude and phase. A single carrier level is now produced at 7 which relates to the distance between the object and the probe. Amplifier 24 linearizes the signal and detector 29 provides an output to connector 21, the signal being proportional to the position of object 4 within the range of the instrument.

The short transmission lines leading from coils 5 and 6 to points 27 and 28 should be considered as divided continuations of line 2, with coils 3, 5, and 6 serving as differential coupling links responding to external fields. The function of the probe is the some as in FIG. 1 except for the fact that the signals are now brought out is phase. Line 7 should be considered as a unified continuation of the split lines leading from coils 5 and 6 and as a final continuation of the primary transmission line 2, but now carrying only the difference signal of the lines. The main carrier signal is absorbed in resistors 30 and 32. In this case, the probe functions as a modulating device along the transmission line. The logarithmic amplifier 24 may be of a wide-band tuned type similar to those used in radar applications. The master feedback loop 25 and 26 derives its voltage from the instantaneous modulation envelope amplitude at the detector 29 and is used to adjust the logarithmic response curve of the amplifier 24 by reducing the gain as the modulation envelope increases. Proper selection of components 25 and 26 will improve the rise and fall characteristics of the modulated carrier envelope at the amplifier's output and prevent oscillation.

In the event of ionizing radiations there may appear a leakage current between primary coil 3 and coils 5 and 6. In the event this happens, these leakages appear in phase on each output coil, are 180° out of phase at the end of delay line 31, and are cancelled upon reaching the potentiometer 32. Electromagnetic interference is cancelled in the same manner. A common connection C is provided.

Figure 3:
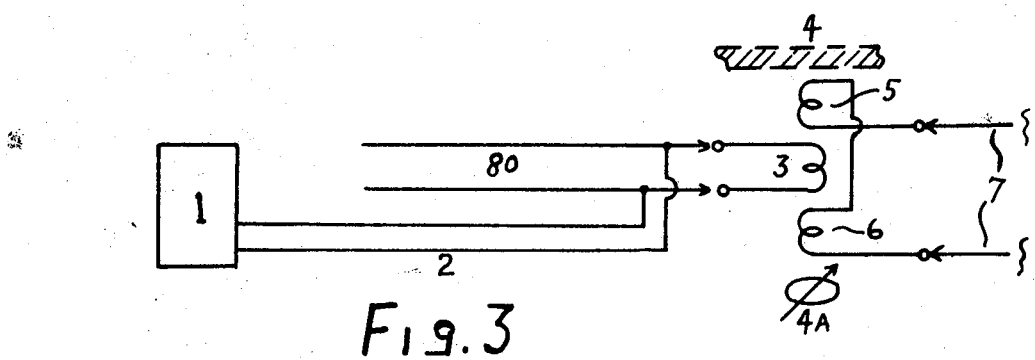

FIG. 3 shows a probe circuit which may be used instead of the probe and balance circuit shown in FIG. 2. In this case, the oscillator is connected to a matching stub 80 which in turn connects to coil 3. Output coils 5 and 6 are now connected to the transmission line leading to the remote station instead of the balancing circuit. The only balancing provided is by the positioning of the respective coils and by the adjustment of balancing ring 4A which has the opposite effect as object 4.

Figure 4:
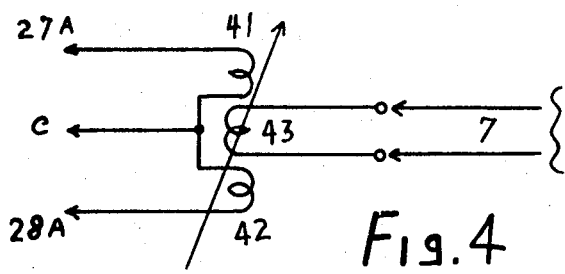

FIG. 4 shows a balancing scheme that may be used as an alternate to the delay line system in FIG. 2. Points 27A and 28A are connected in place of 27 and 28 and C is connected to the common. Balance is provided by adjustment of the positioning of coils 41, 42, and 43. Coil 43 supplies the output and is connected to transmission line 7 which corresponds to that shown in FIG. 2.

It will be noted that unwanted interference arriving in the common mode will cancel at potentiometer 32 only when it lies in a frequency band corresponding to some odd multiple of the delay line which is normally cut for one-half wavelength at the operating frequency. Interfering signals outside this frequency band will not be accepted by the tuned logarithmic amplifier. The advantage of the system lies in the fact that most of the induced interference, whether occuring from ionization leakage, inductance coupling, or capacitance coupling will appear in the common mode on both of the dual short transmission lines and will be cancelled by the phase reversal of the delay line, or alternate method if one is chosen. While the scope of the invention does include alternate phase reversal methods, the delay line is preferred because the lines can be terminated in resistive matching loads in a simple manner. The tuning stub in FIG. 3 is for further reduction of the primary coil's impedance, and improvement of the primary transmission line's termination, since this modified arrangement must absorb the major portion of the carrier energy in the probe itself. In this modification, only the differential signal is passed on. The tuning stub may be used in the other embodiments when desired for matching purposes. By using the tuning stub, a single turn loop can serve as the primary coil.

I claim:

1. An electrical proximity measuring instrument responsive to induced eddy currents comprising in combination an oscillator, a primary transmission line, a differential sensing probe having a primary coil and two secondary coils, two secondary transmission lines, two tuned carrier-level detectors, means bypassing the filtering radio frequency, and means balancing and algebraically adding two opposing signals; said oscillator producing a carrier current at a frequency sufficient for good envelope resolution when said carrier current is under very rapid modulation, said primary transmission line coupling an output of said oscillator to said primary coil of said sensing probe, said two secondary coils closely coupling by inductance to said primary coil, all of said coils having low internal capacitance, said two secondary coils connecting individually to said two secondary transmission lines, all of said coils having impedances of the same order as all of said transmission lines and functioning together as a relatively low impedance differential coupler along said transmission lines in response to said induced eddy currents, said secondary transmission lines functioning as dual extensions of said primary transmission line by means of said primary and secondary coils and carrying differential carrier currents resulting from said eddy currents, each of said secondary transmission lines individually terminating at an input of each of said carrier-level detectors, said carrier-level detectors being tuned to the frequency of said oscillator, said carrier-level detector's inputs being optimized for best transmission line termination and least characteristic resonance effect from parametric variations of said secondary coils, said means bypassing and filtering radio frequency being attached to the outputs of said tuned detectors, said tuned detectors producing opposing DC voltages proportional to the instantaneous carrier current and during the same half cycle of said carrier current, and said opposing DC voltages being balanced and algebraically added by said means balancing and algebraically adding to produce a final output signal proportional to the effect of said eddy currents at said sensing probe and unresponsive to common-mode signals and carrier frequencies outside the selected passband.

2. An electrical proximity measuring instrument responsive to induced eddy currents comprising in combination an oscillator, a primary transmission line, a differential proximity sensing probe having at least one primary coil and and at least two secondary coils, dual short secondary transmission lines, a network for balancing and cancelling common-mode carrier currents, a main secondary transmission line, a logarithmic amplifier, a carrier-level detector, a radiofrequency filter, and an output;

said oscillator producing a carrier current of sufficient frequency for good envelope resolution when said carrier current is modulated at very high rates, said primary transmission line connecting an output of said oscillator to said at least one primary coil, said at least two secondary coils individually connecting to said dual short secondary transmission lines, said dual short secondary transmission lines being no longer than a few wavelengths of said carrier current, all of said coils having relatively low impedances of the same order as all of said transmission lines, all of said coils having relatively low internal capacitance, said at least two secondary coils closely coupling by inductance to said at least one primary coil and functioning therewith as a differential coupler along said transmission lines in response to said induced eddy currents, said short secondary transmission lines functioning as dual extensions of said primary transmission line by means of said differential coupler, each of said dual short transmission lines individually terminating at individual inputs of said network for balancing and cancelling common-mode carrier currents, said network having means for adjusting the phase angle and amplitudes of incoming carrier currents, said network having an output delivering a carrier current proportional to a differential of said carrier currents arriving at said individual inputs but effectively terminating the carrier current energy arriving in the common mode, said main secondary transmission line having any desired practical length and connecting said output of said network to an input of said logarithmic amplifier, said logarithmic amplifier being tuned to the frequency of said oscillator and having a frequency-bandwidth sufficient for said carrier current and modulation sidebands, said carrier level detector receiving an output of said logarithmic amplifier and producing therefrom a DC signal proportional to the instantaneous envelope amplitude of said logarithmic amplifier output, adjustable means feeding back a sample of said instantaneous envelope amplitude to a gain-sensitive area of said logarithmic amplifier, said radiofrequency filter removing any remaining carrier current ripple from said DC signal, and said output delivering a final output signal proportional to the instantaneous distance between said proximity sensing probe and an object under observation.

3. The instrument defined in claim 2 where said network for balancing and cancelling said common-mode carrier current contains a delay line for phase inversion and a potentiometer serving as a null selector and common-mode terminating resistor.

4. The instrument defined in claim 2 where said network for balancing and cancelling said common-mode carrier contains an inductive coupler having at least two primary windings and at least one secondary winding, said windings having adjustable coupling by inductance to provide cancellation of common-mode signals and transmission of differential-mode signals.

5. The instrument defined in claim 2 where the impedance of said primary winding is made lower than that of said primary transmission line by the use of a tuned stub.

6. An electrical proximity-measuring instrument responsive to induced eddy currents comprising in combination an oscillator, a primary transmission line, a differential sensing probe having at least one primary coil and at least two secondary coils, a secondary transmission line, a logarithmic amplifier, a carrier level detector, a radiofrequency filter, and an output; said oscillator producing a carrier current of sufficient frequency for good envelope resolution when said carrier current is under very rapid modulation, said primary transmission line connecting an output of said oscillator to said at least one primary coil, said at least two secondary coils being connected in series opposition and having an output connected to said secondary transmission line, said secondary coils tightly coupling to said at least one primary coil by inductance, said secondary coils producing an output proportional to any unbalance in said coupling to said at least one primary coil, all of said coils being of low impedance and absorbing carrier current energy and serving as termination for said primary transmission line with the exception that differential energy is coupled out to said secondary transmission line, said differential sensing probe having means to adjust said coupling of said secondary coils, said secondary transmission line being of any practical length and terminating at an input of said logarithmic amplifier, said logarithmic amplifier being tuned to the frequency of said oscillator and having a frequency-bandwidth sufficient for said carrier current and modulation sidebands, said carrier level detector receiving an output of said logarithmic amplifier and producing therefrom a DC signal proportional to the instantaneous envelope amplitude of said logarithmic amplifier output, adjustable means feeding back a sample of said instantaneous envelope amplitude to a gain-sensitive area of said logarithmic amplifier, said radiofrequency filter removing remaining carrier current from said DC signal, and said output delivering a final output signal proportional to the instantaneous distance between said proximity probe and an object under observation.

7. The instrument defined in claim 6 where said means to adjust said coupling of said secondary soils is an adjustable shorting ring.

8. The instrument defined in claim 6 where the carrier current termination capability of said at least one primary coil is improved by placing said coil at one end of a tuned stub.

UNITED STATES PATENT OFFICE
CERTIFICATE OF CORRECTION

Patent No. 3,609,527        Dated September 28, 1971

Inventor(s) James F. Ellis

It is certified that error appears in the above-identified patent and that said Letters Patent are hereby corrected as shown below:

Column 1, line 10, cancel "other"; line 13, "halves" should read -- of --; line 54, "nearby an object if not" should read -- to an object is not --; line 62, "mHz" should read -- MHz --.

Column 2, line 22, "mHz" should read -- MHz --.

Column 6, line 6, "the" should read -- and --; line 66, after "said" insert -- dual --.

Column 8, line 35, "soils" should read -- coils --.

Signed and sealed this 25th day of April 1972.

(SEAL)
Attest:

EDWARD M. FLETCHER, JR.              ROBERT GOTTSCHALK
Attesting Officer                    Commissioner of Patents